Nov. 6, 1928.  
G. A. JAMERSON  
1,690,490  
AUTOMOBILE CHASSIS LUBRICATING SYSTEM  
Filed Feb. 6, 1924  2 Sheets-Sheet 1
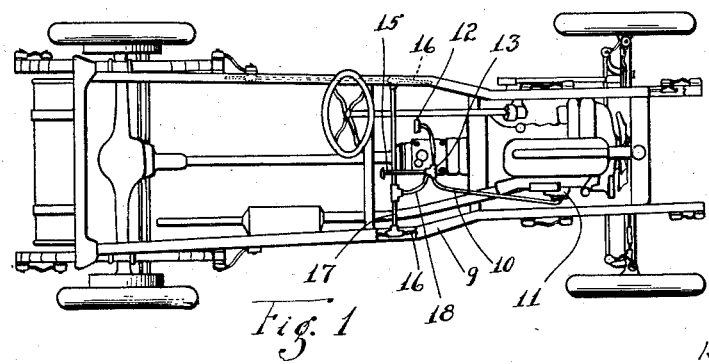
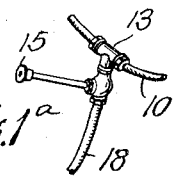
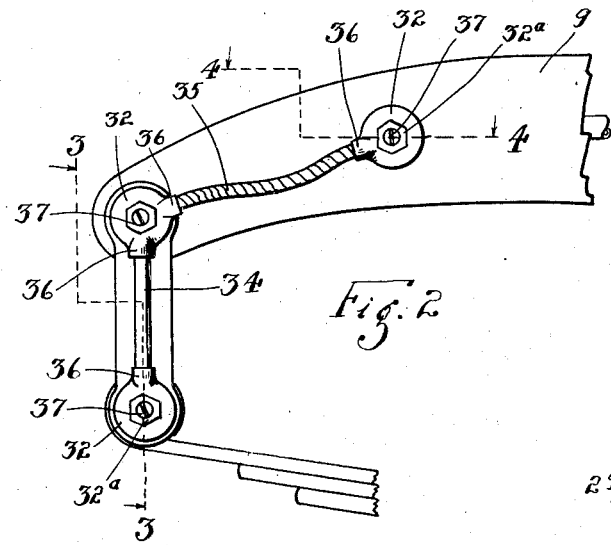
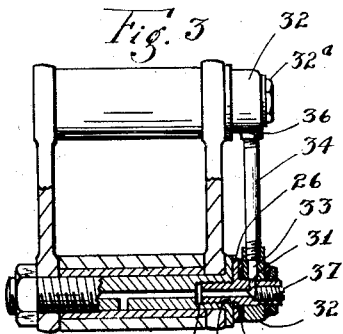
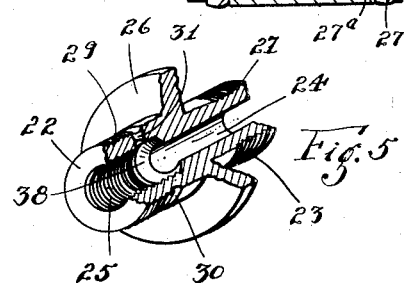
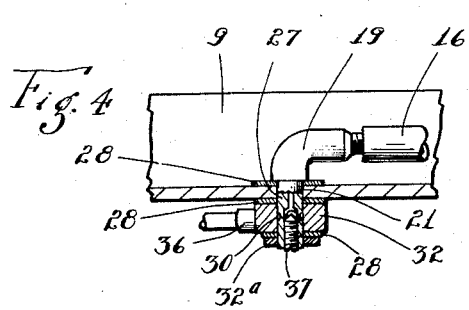
Inventor  
GUS A. JAMERSON  
By Murray and Gugelter  
Attorneys

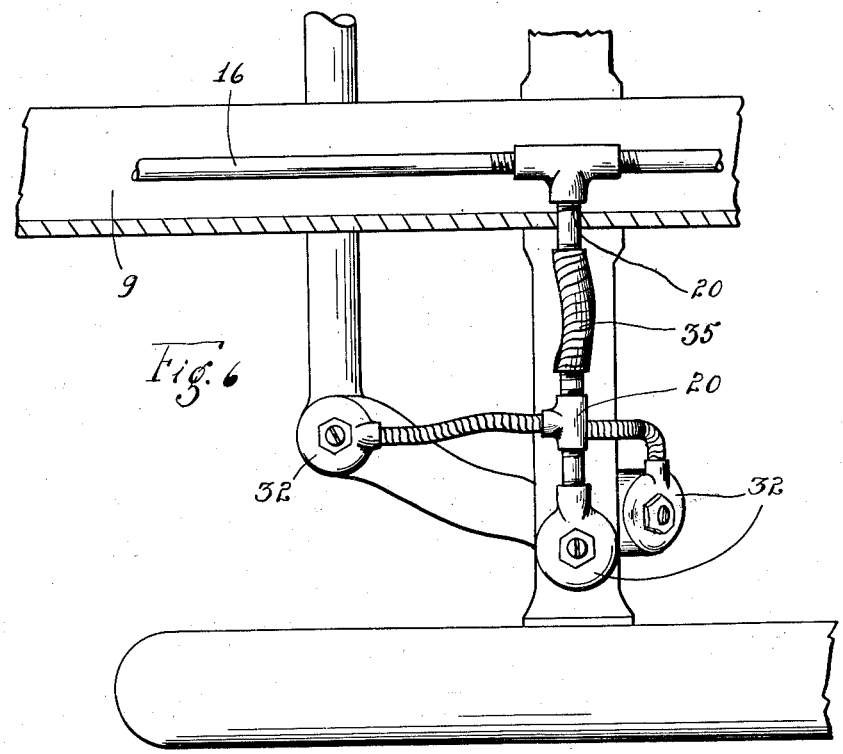
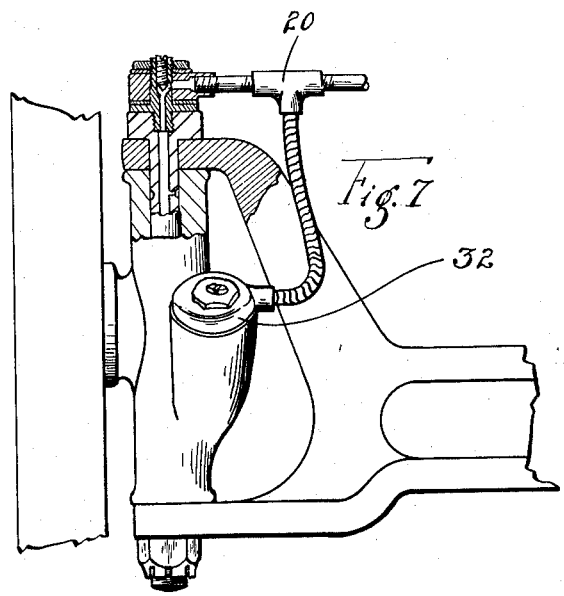

Patented Nov. 6, 1928.

1,690,490

UNITED STATES PATENT OFFICE.

GUS A. JAMERSON, OF CINCINNATI, OHIO, ASSIGNOR TO MAX STERN, OF CINCINNATI, OHIO.

AUTOMOBILE CHASSIS-LUBRICATING SYSTEM.

Application filed February 6, 1924. Serial No. 690,940.

This invention relates to devices and systems for lubricating the various bearings in the chassis of a motor vehicle.

It is the general object of the invention to devise a system for supplying lubricant automatically, and preferably continuously, to the various bearings in the chassis of a motor vehicle. The invention further aims to provide a system of this character in which a substantially uniform distribution of the oil throughout the system can be maintained, thus ensuring the delivery of an adequate quantity of lubricant to each bearing, to provide for the convenient control of the system by the driver, and the prompt detection of any serious leak or break in the system.

These and other objects are attained by the means described herein and disclosed in the accompanying drawings in which—

Fig. 1 is a plan view of an automobile chassis equipped with a lubricating system of my invention.

Fig. 1ª is a perspective view showing certain features of the oil supply line.

Fig. 2 is a view of a portion of the side of the chassis showing a detail of my invention.

Fig. 3 is a view taken on line 3—3 of Fig. 2.

Fig. 4 is a view taken on line 4—4 of Fig. 2.

Fig. 5 is a cross-sectional perspective view showing a detail of my invention.

Fig. 6 is a plan view on an enlarged scale showing a portion of the front end of the chassis.

Fig. 7 is a front elevation of the parts shown in Fig. 6—some of the parts being shown in cross section.

The various bearings and joints in an automobile chassis are usually provided with tapped oil holes into which oil cups or grease cups are screwed.

My invention includes a lubricator adapted to be mounted on the usual chassis 9 of an automobile whereby lubricant under suitable pressure may be supplied to all bearing surfaces both on the frame and the movable parts of the chassis. The device is intended for use primarily on motor vehicles which are provided with forced feed motor lubrication, and such vehicles practically always have an oil pressure gage on the instrument board. The tube 10 of the oil line leading from the motor oil pump 11 to the oil gage 12 is severed and a T joint 13 is inserted in the oil line. A suitable cut off valve 14 is connected in the oil supply line leading from the T joint so that when this valve is closed the gage 12 will register in the same manner as it did before the T joint was assembled in the oil line. The cutoff valve 14 thus controls the oil supply to the lubricating system of my invention. A suitable strainer (not shown) is also provided adjacent the cut off valve to avoid the possibility of foreign matter entering the lubricating system. The valve 14 is operated by any desired means such as a rod 15 readily accessible from the driver's seat. Supply tubes 16, which are preferably of copper, extend along the longitudinal channels of the chassis 9 and communicate with the valve 14 thru a lateral pipe 17 and tube 18. In practice it has been found better to place the tubes 16 within the channels of the chassis in order to afford greater protection thereto and to lead the various elbows 19 (see Fig. 4) and T's 20 (see Fig. 6) thru holes in the channels of the chassis. For example at the rear end of the chassis as shown in Fig. 2, and more especially in Fig. 4, an elbow 19 is screwed into the end of the tube 16 and extends through a hole in the chassis 9.

Lubricators of the construction partly shown in Fig. 5 are used throughout the system to replace oil and grease cups and are also used at all points where the oil supply line passes through the channel beams of the chassis, as shown, for example, in Fig. 4.

The lubricator 22, Fig. 5, comprises a tubular member 23 having a smooth bore 24 extending part way therethrough and an enlarged screw threaded bore 25 connecting the smooth bore with one end of said member. A circular flange 26 integral with said member extends radially therefrom at a point approximately midway between its ends. Both end portions of the member are externally threaded, as indicated at 27 and 29. At about the end of the threaded portion 29 a circumferential groove 30 is formed in the outer surface of the lubricator, and one or more holes 31 connect this groove with the threaded bore 25. Fitting snugly over the grooved portion of the lubricator is an annular collar 32 which is held in this position by a nut 32ª, fibre washers 28—28 being interposed between the opposite faces of the collar and the flange 26 and nut 32ª, respectively, so that a substantially oil tight joint is formed between the collar 32 and the lubricator body 22. At the same time the collar is permitted to rock or rotate relatively to the lubricator body 22.

In order to conduct oil or other lubricant to or from the lubricator, the collar 32 is provided with one or more bosses 36, each boss being internally drilled or threaded to receive either the threaded end of a rigid tube, such as that shown at 34, or the end of a flexible tube, such as that shown at 35. With this arrangement the lubricators may be connected into the oil supply line at any desired point or points. It will be observed that oil can flow freely from one of the tubes 34 or 35 through the groove 30 and holes 31 into the bore 25, or in a reverse direction.

In order to regulate the flow of oil through the bore of the lubricator, a screw 37 is threaded into the bore 25 and preferably is provided with a tapered end to engage the seat 38, Fig. 5, at the junction of the screw threaded bore 25 with the reduced bore 24. By adjusting this screw more or less away from its seat, the resistance offered to the flow of oil through the device can be regulated very accurately, as will be readily understood. This is an important practical advantage since the resistance offered to the flow of lubricant through the different bearings will vary with the conditions in the individual bearings. Some may be fitted more tightly than others and some will wear more rapidly than others. By properly adjusting the screws 37 in the individual lubricators, the distribution of the oil can be regulated as desired.

A typical method of conducting the oil to the rear shackle bolts is shown in Figs. 2, 3 and 4, the end of the supply tube 16 being connected to a lubricator 22 at the point where it is desired to conduct the oil through the web of the channel member 9, and the oil being carried from this lubricator to the lubricator for the upper shackle bolt by the flexible tube 35. Part of the oil is delivered to the upper shackle bolt while some of it flows through the tube 34 to the lubricator for the lower shackle bolt.

In the same manner the oil cups are replaced throughout the chassis, in shackle bolts, king pins and in fact all parts requiring lubrication. It is only necessary to provide sections of flexible tubing 35 between parts of the chassis having relative movement as is shown in Fig. 6.

In operation the system is mounted upon the chassis 9 by replacing the usual oil cups and grease cups with lubricators of my invention and connecting the same to the supply tubes 16 and connecting the T joint 13 to the motor oil pump. The crank case is filled with a fresh supply of oil and the motor is started. In order to facilitate the initial circulation of oil the screws 37 may be removed to permit the air to exhaust from the tubes. As the oil reaches each lubricator the screws are inserted and adjusted to permit the proper flow of oil to be admitted to each bearing to be lubricated.

As soon as the oil has reached all points and all the screws 37 are adjusted, the gage 12 on the instrument board will register the oil pressure. Should a break or a leak occur in the system it may be readily detected by observing the drop in pressure as indicated by the oil gage. It should be noted that the oil does not return to the crank case and thus not only prevents the carrying of dust and grit to the crank case but tends to wash the dust from the bearing faces of the parts lubricated.

The force feed oil pump which forms part of the motor equipment is normally supplied with a strainer or filtering means and a strainer may be also provided in the system adjacent the cut off valve 14 so that a supply of clean lubricant is insured throughout the system.

In using this system it is not necessary to pump oil constantly through the lubricators, although the system can be operated in this manner if desired. Usually, however, it is sufficient for the driver to open the valve 14 occasionally and thus admit oil from the oil pump of the motor to the chassis lubricating system. Since the valve 14 is constantly under his control and may be easily opened at any time by turning the rod 15, it is a very simple matter to lubricate all the bearing points in the chassis. The system can be conveniently installed, requires practically no attention when once in place and such adjustments as may be required by wear can be made easily and quickly.

Having thus described my invention, what I desire to claim as new is:—

1. A lubricator of the character described comprising a tubular body having a circumferential groove in its outer surface and a hole connecting said groove with the bore of said body, a collar mounted on said body, said collar being constructed for the connection thereto of a supply tube and having a hole therethrough providing communication between said tube and said groove, means for holding said collar in its operative position on said body, and adjustable means adjacent said collar for regulating the flow of lubricant through said body.

2. A lubricator of the character described comprising a tubular body having a circumferential groove in its outer surface and a hole connecting said groove with the bore of said body, a collar mounted on said body, said collar being constructed for the connection thereto of a supply tube and having a hole therethrough providing communication between said tube and said groove, means for holding said collar in its operative position on said body, one end of said body being externally screw threaded and the opposite end internally screw threaded and a screw threaded into the latter end of said body and adjustable therein to regulate the flow of lubricant through the body.

3. A lubricator of the character described, comprising a tubular body having a bore therethrough with one part of the bore larger than the other and the two parts separated from each other by a seat, said body having a circumferential groove in its outer surface and a hole connecting said groove with the larger portion of said bore adjacent to said seat, a collar mounted on said body, said collar being constructed for the connection thereto of a supply tube and having a hole providing communication between said tube and said groove, a screw threaded into the larger section of said bore and adjustable toward and from said seat to control the flow of lubricant through said body, and means for holding said collar in its operative position on said body but permitting adjustment of the collar around the axis of the body.

4. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, and adjustable means associated with each lubricator for regulating the flow of lubricant through the individual lubricators to their respective bearings.

5. In a motor vehicle having a lubricating pump and a chassis having bearings provided with lubricator openings, the combination of lubricators mounted respectively in said openings, each of said lubricators being provided with a bore registering with the opening in the bearing, a supply line for conducting lubricant under pressure from the pump to a series of said lubricators, adjustable means associated with each lubricator for regulating the flow of lubricant through the individual lubricators to their respective bearings, and additional manually operable means for controlling the supply of lubricant to the entire series of lubricators.

In testimony whereof, I, have hereunto subscribed my name this 30th day of January, 1924.

GUS A. JAMERSON.